US005656201A

United States Patent [19]
Visca et al.

[11] Patent Number: 5,656,201
[45] Date of Patent: *Aug. 12, 1997

[54] AQUEOUS MICROEMULSIONS COMPRISING FUNCTIONAL PERFLUOROPOLYETHERS

[75] Inventors: Mario Visca, Alessandria; Daria Lenti, Valenza, both of Italy

[73] Assignee: Ausimont S.r.l., Italy

[*] Notice: The term of this patent shall not extend beyond the expiration date of Pat. No. 5,017,307.

[21] Appl. No.: 118,278

[22] Filed: Sep. 9, 1993

Related U.S. Application Data

[63] Continuation of Ser. No. 841,291, Feb. 28, 1992, abandoned, which is a continuation of Ser. No. 563,841, Aug. 7, 1990, abandoned, which is a continuation of Ser. No. 261,226, Oct. 24, 1988, abandoned.

[30] Foreign Application Priority Data

Oct. 28, 1987 [IT] Italy .................................... 22420/87

[51] Int. Cl.$^6$ .................................................. B01J 13/00
[52] U.S. Cl. ...................... 252/309; 252/312; 526/911
[58] Field of Search .................................... 252/309, 312; 514/832, 833; 526/247, 911

[56] References Cited

U.S. PATENT DOCUMENTS

| | | | |
|---|---|---|---|
| 3,451,908 | 6/1969 | Sianesi et al. | 204/157.87 X |
| 3,513,203 | 5/1970 | Sianesi et al. | 252/364 X |
| 3,564,059 | 2/1971 | Sianesi et al. | 568/593 X |
| 3,665,041 | 5/1972 | Sianesi et al. | 568/385 X |
| 3,778,381 | 12/1973 | Rosano et al. | 252/312 X |
| 3,981,361 | 9/1976 | Healy | 166/252 |
| 4,146,499 | 3/1979 | Rosano | 252/312 X |
| 4,443,480 | 4/1984 | Clark, Jr. | 514/832 X |
| 4,722,904 | 2/1988 | Feil | 252/312 X |
| 4,917,930 | 4/1990 | McCormick | 514/832 X |
| 4,985,550 | 1/1991 | Charpiot et al. | 514/832 X |
| 4,990,283 | 2/1991 | Visca et al. | 252/309 |
| 5,017,307 | 5/1991 | Chittofrati et al. | 252/500 |

FOREIGN PATENT DOCUMENTS

| | | |
|---|---|---|
| 227103 | 7/1987 | European Pat. Off. . |
| 250766 | 1/1988 | European Pat. Off. . |

OTHER PUBLICATIONS

"Microemulsions Theory and Practice", Leon M. Prince, Academic Press Rapid Manuscript, 1977.

*Primary Examiner*—Richard D. Lovering

[57] ABSTRACT

Perfluoropolyether microemulsions of the oil-in-water or water-in-oil type, consisting of perfluoropolyethers exhibiting an average molecular weight from 1,500 to 10,000, the end groups of which being at least partially of the functionalized type, optionally containing peroxide bridges in the chain and consisting of mixtures of products having different molecular weights, of a perfluorinated surfactant and/or a co-surfactant of the alkanol type having 1 to 12 C, and of an aqueous liquid optionally comprising an electrolyte.

15 Claims, No Drawings

AQUEOUS MICROEMULSIONS COMPRISING FUNCTIONAL PERFLUOROPOLYETHERS

This is a continuation of application Ser. No. 07/841,291, filed on Feb. 28, 1992, now abandoned, which is a continuation of Ser. No. 07/563,841 filed on Aug. 7, 1990, now abandoned, which is a continuation of Ser. No. 07/261,226 filed on Oct. 24, 1988, now abandoned.

BACKGROUND OF THE INVENTION

Patent applications No. 20,910 A/86 and 19,494 A/87 in the name of the Applicant hereof disclose microemulsions comprising perfluoropolyethers (PFPE) having perfluoroalkyl end groups, obtained by using fluorinated surfactants and optionally fluorinated or non-fluorinated co-surfactants, such as alkanols and fluoroalkanols, and optionally electrolytes.

Generally, in the abovesaid microemulsions the maximum amount of solubilized PFPE in the aqueous phase was depending on the utilized amounts of surfactant and of co-surfactant, as the maximum obtainable PFPE/water interphase could be considered as lower than, or at the most equal to the sum of the areas of the surfactant and co-surfactant polar heads.

Therefore it would be very useful, for example for uses in the polymerization of fluorinated monomers, as is described in patent application Ser. No. 20,909 A/86 in the name of the Applicant, to have available a microemulsion characterized by the presence of a water-soluble surfactant and co-surfactant in an amount lower than the one which is required for the microemulsions of PFPE having perfluoroalkyl end groups.

It has now surprisingly been found that it is possible to prepare microemulsions characterized by a lower concentration of surfactant and co-surfactant and even free from added water-soluble perfluorinated surfactant, if a PFPE having end groups at least partially of the non-perfluoroalkyl type is used.

Thus, an object of the present invention are microemulsions of PFPE having at least partially non-perfluoroalkyl end groups. By "microemulsion" there are usually meant products macroscopically consisting of a single liquid, transparent or opalescent and optically isotropic phase, comprising two immiscible liquids and at least a surfactant, in which products one of the two immiscible liquids is dispersed in the other in the from of droplets having diameters ranging from about 50 to 2,000 A°.

In principle it cannot be excluded that particles having higher or lower sizes up to the limit of the molecular dispersion may be present. Furthermore, structures may be present, in which both liquids, interdispersed as bicontinuous tri-dimensional immiscible films are co-solubilized at a molecular level.

Such products spontaneously form by simple mixing of the components and are indefinitely stable in a certain temperature range, defined later on as existence range.

Whenever used herein, the term "microemulsion" has a broader meaning, comprising also non optically isotropic systems (i.e. birefractive), characterized by an orientation of the liquid-crystalline type of the components.

The perfluoropolyethers of the present invention are characterized in that they can be a mixture of components of different molecular weight, comprising a perfluoropolyether chain, in which a few end groups do not consist of perfluoroalkyl groups but of functional groups.

Such end groups may be monovalent or polyvalent.

Furthermore, the functional groups can be present on ramifications of the perfluoropolyethereal chain, as is described in Italian patent application No. 20,346 A/86.

The preferred average functionality of the molecules is in the range from 0.1 to 4, preferably from 0.1 to 2 and most preferably from 0.3 to 1.

The functional groups present in the PFPE chains are representable by the formula:

wherein n=0 or 1, B is a divalent or polyvalent, in particular an alkylene or a cycloalkylene or an arylene linking hydrocarbon radical, having up to 20 carbon atoms and preferably up to 8 carbon atoms, m varies from 1 to 3 and preferably is 1, and T is one of the following groups or radicals: —H, —COOH, —SO$_3$H, —OH, —polyoxyalkylene—OH, an ester or amidic group, or an aminic or quaternary ammonium group. The preferred end groups are: —COOH, —OH, —polyoxyalkylene—OH, quaternary ammonium groups. The acid end group is preferably salified.

As starting products it is possible to use also perfluoropolyethers with —COF or —SO$_2$F end groups which, in the preparation of the microemulsion, hydrolize to —COOH and —SO$_3$H groups.

The average molecular weight of the perfluoropolyethereal chain ranges from 1,500 to 10,000, and preferably from 2,000 to 6,000.

Generally, aqueous microemulsions comprising perfluoropolyethers having end groups with hydrophilic functionality (for example COOH, polyoxyalkylene—OH, etc.) exhibit the property of requiring, for being formed, a lower surfactant amount with respect to corresponding microemulsions of PFPE having perfluoroalkyl end groups, because the hydrophilic groups co-operate in the formation of an interphase film, which renders the perfluorooxyalkylene chains compatible with the aqueous solution, although the functionalized PFPE molecules are substantially insoluble. At the limit, it is possible to prepare functional PFPE microemulsions with hydrophilic functionality even in the total absence of added surfactant and only in the presence of a co-surfactant, which should be preferably hydrogenated.

Preferred perfluoropolyethers for the preparation of the microemulsions according to the invention, having $R_f$, $R'_f$ end groups of the functionalized type and optionally in part also of the perfluoroalkyl type, as pointed out above, are the ones consisting of fluorooxyalkylene units selected from the following:

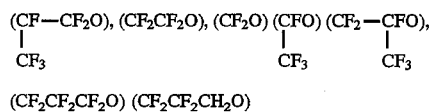

and in particular belonging to the following classes:

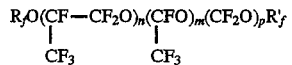

with a random distribution of the perfluorooxyalkylene units, where m, n, p have such average values as to meet the abovesaid requirements regarding the previously indicated molecular weight and $R_f$ and $R'_f$ are functional groups, and optionally in part perfluoroalkyl groups;

2) $R_fO(CF_2CF_2O)_n(CF_2O)_mR'_f$
with a random distribution of the perfluorooxyalkylene units, wherein m, n have such values as to meet the abovesaid requirements;

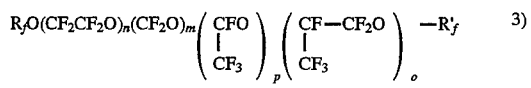

wherein m, n, p, o have such values as to meet the above-indicated requirements;

wherein n has such a value as to meet the above-indicated requirements;

5) $R_fO(CF_2CF_2O)_nR'_f$
wherein n has such an average value as to meet the abovesaid requirements;

6) $R_fO(CF_2CF_2O)_nR'_f$ or $R_fO(CH_2CF_2CF_2O)_nR'_f$
wherein n has such a value as to meet the abovesaid requirements.

Perfluoropolyethers of class (1) are known on the market under the trade-mark Fomblin® Y, those of class (2) under the trade-mark Fomblin® Z, all of them being manufactured by Montedison. Commercially known products of class (4) are Krytox® (DuPont).

The products of class (5) are described in U.S. Pat. No. 4,523,039; those of class (6) are described in European patent No. EP 148,482 to Daikin.

The ones of class (3) are prepared according to U.S. Pat. No. 3,665,041. Suitable are also the perfluoropolyethers described in U.S. Pat. No. 4,523,039 or in J. Am. Chem. Soc. 107, 1195–1201 (1985).

The products of classes 1, 2, 3, which are obtained through photochemical oxidation processes, are utilizable as raw products of the photo-oxidation process, which contain peroxide groups —OO— in the chain, said groups being inserted between the perfluorooxyalkylene units.

Perfluoropolyethers suited to the preparation of the microemulsions according to the invention are also the ones disclosed in Italian patent application No. 20,346 A/86, which comprise functional groups of the above-indicated type arranged along the chain and functional or perfluoroalkyl end groups.

The fluorinated surfactants to be used according to the present invention may be ionic or non-ionic. In particular, the following ones can be cited:

(a) perfluorocarboxylic acids with 5 to 11 carbon atoms and the salts thereof;
(b) perfluorosulphonic acids with 5 to 11 carbon atoms and the salts thereof;
(c) the non-ionic surfactants cited in European patent application No. 0051526 consisting of a perfluoroalkyl chain and of a polyoxyalkylene hydrophilic head;
(d) mono- and bi-carboxylic acids derived from perfluoropolyethers having mean molecular weight not higher than 1000, and the salts thereof;
(e) the non-ionic surfactants consisting of a perfluoropolyethereal chain bound to a polyoxyalkylene chain;
(f) perfluorinated cationic surfactants or those derived from perfluoropolyethers having 1, 2 or 3 hydrophobic chains.

As a co-surfactant it is possible to use a hydrogenated alcohol having 1 to 12 carbon atoms, preferably 1 to 6 carbon atoms.

EXAMPLES

The following examples are given merely to illustrate the present invention and are not to be considered as a limitation of the possible embodiments thereof.

Example 1

16,992 g of a rough perfluoropolyether belonging to class 1, with —COF end groups, having an average functionality equal to 0.57 and an average viscosimetric molecular weight equal to 4,000, containing peroxide bridges (PO=1.02% by weight) and consisting of a mixture of polymers having a different molecular weight, were neutralized with 0.3 ml of an ammonia solution at 30% by weight of $NH_3$. 3.74 ml of t.butanol were added to the system, thereby obtaining a limpid, transparent solution, which was indefinitely stable in the temperature range of from 25° to 75° C.

The weight composition of the system was as follows:
aqueous phase: 1.48%
alcohol: 14.75%
rough perfluoropolyether: 83.77%.

The obtained microemulsion was of the water-in-oil (w/o) type.

Example 2

Following the modalities described in the preceding example 1, a solution was prepared, whereto 2.2 ml of bidistilled water were added under gentle stirring.

The resulting system was still composed of a single limpid, transparent phase, which was indefinitely stable in the temperature range of 25°–75° C.

The weight composition of the system was as follows:
aqueous phase: 11.12%
alcohol: 13.31%
rough perfluoropolyether: 75.57%.

The obtained microemulsion was of the w/o type.

Example 3

Following the modalities described in the preceding example 2 a solution was prepared, to which 1.2 ml of bidistilled water were added under gentle stirring.

The resulting system was still composed of a single limpid, transparent phase, which was indefinitely stable in the temperature range of 25°–75° C.

The weight composition of the system was as follows:
aqueous phase: 15.63%
alcohol: 12.63%
rough perfluoropolyether: 71.74%.

The obtained microemulsion was of the w/o type.

Example 4

1.26 g of a rough perfluoropolyether belonging to class 1, with —COF end groups, having an average functionality of 0.46 and an average viscosimetric molecular weight equal to 4,600, containing peroxide bridges (PO=1.02%) and consisting of a mixture of polymers having different molecular weights, were neutralized with 0.3 ml of an ammonia solution at 10% by weight of $NH_3$ and additioned with 1 ml of bidistilled water.

To such mixture there were added, under gentle stirring, 0.05 ml of a surfactant consisting of an acid having a perfluoropolyethereal structure belonging to class 1 and exhibiting an average equivalent weight equal to 668, and 0.6 ml of terbutanol corresponding to a fluorinated surfactant/alcohol weight ratio equal to 0.18.

A microemulsion did form, which, macroscopically, was in the form of a limpid, transparent liquid, that was indefinitely stable at room temperature.

By heating the product to temperatures higher than 35°–40° C., the system tended to separate into two phases and the product became turbid.

By cooling to room temperature, the system spontaneously regained the characteristics of a microemulsion.

The weight composition of the system was as follows:

aqueous phase: 41.53% alcohol: 15.34% fluorinated surfactant: 2.87% rough perfluoropolyether: 40.26%.

Example 5

To 2.65 ml of the system described in example 4, 2 ml of bidistilled water were added at room temperature.

The resulting system was in the form of a single limpid and transparent phase, which was stable in the temperature range of 25°–75° C.

The weight composition of the system was as follows:

aqueous phase: 64.10% alcohol: 9.55% fluorinated surfactant: 1.75% rough perfluoropolyether: 24.60%.

The obtained microemulsion was of the oil-in-water (o/w) type.

Example 6

0.7 g of a rough PFPE belonging to class 1 having an average equivalent weight of 6250 with respect to the acid end groups and an average viscosimetric molecular weight of 3500, containing peroxide bridges (PO=1.01%) and consisting of a mixture of polymers having different molecular weights, were neutralized with 0.2 ml of an ammonia solution at 10% by weight of $NH_3$ and were added with 1.8 ml of bidistilled water.

To the resulting system there were added, under gentle stirring, 0.16 ml of a surfactant consisting of an acid having a perfluoropolyethereal structure belonging to class 1 composed of a mixture of components having different molecular weight and with an average equivalent weight equal to 668, and 0.54 ml of isopropanol.

Obtained was a system macroscopically composed of a single limpid and transparent phase, which was stable in the temperature range of 25°–75° C.

The weight composition of the system was as follows:

aqueous phase: 58.82% alcohol: 15.88% fluorinated surfactant: 4.71% rough perfluoropolyether: 20.59%.

The resulting microemulsion was of the o/w type.

Example 7

0.7 g of a rough perfluoropolyether belonging to class 1, having an average equivalent weight of 6250 with respect to acid end groups and an average viscosimetric molecular weight of 3,500, containing peroxide bridges (PO=1.02%) and consisting of a mixture of polymers with different molecular weights, were neutralized with 0.2 ml of an ammonia solution at 10% by weight of $NH_3$ and were additioned with 1.8 um of $KNO_3$ 0.1M.

To the resulting system there were added 0.16 ml of a surfactant consisting of an acid with perfluoropolyethereal structure belonging to class 1 and having an average equivalent weight equal to 668, as well as 0.54 ml of isopropanol.

Obtained was a system macroscopically composed of a single limpid, transparent phase, which was stable in the temperature range of 25°–75° C.

The weight composition of the system was equal to the one of example 6.

Example 8

1.5 ml of bidistilled water and 0.51 ml of terbutanol were added to 1.0 g of a rough perfluoropolyether belonging to class 1, hydrolized by hot-treatment with $H_2SO_4$ having an average funtionality in —COOH of about 0.57 and an average viscosimetric molecular weight equal to 4,000, containing peroxide bridges (PO=1.01%) and consisting of a mixture of polymers with different molecular weights, neutralized with 0.1 ml of an ammonia solution at 10% by weight of $NH_3$.

Obtained was a solution macroscopically consisting of a single limpid phase, which was stable in the temperature range of 25°–65° C.

The weight composition of the system was as follows:

aqueous phase: 42.02% alcohol: 10.71% rough perfluoropolyether: 47.27%.

Example 9

1.8 g of a rough perfluoropolyether belonging to class 1, hydrolized by hot treatment with $H_2SO_4$, having an average equivalent weight of 7,000 with respect to the acid groups and an average viscosimetric molecular weight of 4,000, containing peroxide bridges (PO=1.01%) and consisting of a mixture of polymers having different molecular weights, were neutralized with 0.2 ml of an ammonia solution at 10% by weight of $NH_3$. Under gentle stirring there were added 0.18 g of a fluorinated alcohol having formula $CHF_2(CF_2)_6CH_2OH$, 0.18 g of a 5M aqueous solution of a surfactant consisting of the ammonium salt of an acid having perfluoropolyethereal structure belonging to class 1 and with an average equivalent weight equal to 367, and 0.15 ml of ter.butanol.

A system macroscopically consisting of a single limpid phase which was stable at room temperature (25°–30° C.) was obtained.

The weight composition of the system was as follows:

aqueous phase: 9.51% hydrogenated alcohol+fluorinated alcohol: 4.23+11.42% fluorinated surfactant: 11.42% rough perfluoropolyether: 63.42%.

The obtained microemulsion was of the w/o type.

Example 10

0.72 g of a rough perfluoropolyether belonging to class 1 having an average functionality of 0.46 with respect to the acid groups and an average viscosimetric molecular weight of 4,600, containing peroxide bridges (PO=1.02%) and consisting of a mixture of polymers having different molecular weights were neutralized with 0.1 ml of an ammonia solution at 10% by weight of $NH_3$ and additioned with 0.8 ml of bidistilled water.

To the system there were added 0.2 ml of a 5M water solution of a surfactant consisting of the ammonium salt of an acid having a perfluoropolyethereal structure belonging to class 1 and having an average equivalent weight equal to 367.

Obtained was a monophase opalescent and room-temperature (25°–30° C.) stable system, which became limpid at a temperature of 65° C.

The weight composition of the system was as follows:
aqueous phase: 48.08%
fluorinated surfactant: 17.31%
rough perfluoropolyether: 34.61%.

Example 11

1.08 g of a rough perfluoropolyether belonging to class 1 having an average equivalent weight of 10,000 with respect to acid groups and an average viscosimetric molecular weight of 4,600, containing peroxide bridges (PO=1.02%) and consisting of a mixture of polymers with different molecular weights, neutralized with 0.5 ml of an ammonia solution of 10% of $NH_3$, were added, under gentle stirring, with 1 ml of a solution at a concentration of 360 g/l of a surfactant consisting of the ammonium salt of an acid having a perfluoropolyethereal structure belonging to class 1, consisting of a mixture of components with different molecular weights and with an average equivalent weight equal to 446.

A microemulsion did form, which macroscopically consisted of a limpid, transparent liquid, which was indefinitely stable in the temperature range of 25°–75° C.

The weight composition of the system was as follows:
aqueous phase: 47.44%
fluorinated surfactant: 13.14%
rough perfluoropolyether: 39.42%.

Example 12

2 ml of a solution at a concentration of 250 g/l of lithium perfluoro-octanesulphonate were added to 0.36 g of a rough perfluoropolyether belonging to class 1, hydrolized by hot treatment with $H_2SO_4$, having an average equivalent weight of 7,000 with respect to the acid groups and an average viscosimetric molecular weight of 4,000, containing peroxide bridges (PO=1.01%) and consisting of a mixture of polymers having different molecular weights, neutralized with 0.1 ml of an ammonia solution at 10% by weight of $NH_3$.

A solution slightly opalescent at room temperature, having birefringence characteristics was obtained.

The weight composition of the system was as follows:
aqueous phase: 65.04%
fluorinated surfactant: 20.33%
rough perfluoropolyether: 14.63%.
The obtained microsolution was of the o/w type.

Example 13

1.1 ml of t.butanol were added to 0.5 ml of the solubilized composition indicated in example 12.

A system composed of a single limpid phase, stable in the temperature range of 25°–75° C. and optically isotropic was obtained.

The weight composition of the system was as follows:
aqueous phase: 47.9%
alcohol: 26.35%
fluorinated surfactant: 14.97%
rough perfluoropolyether: 10.80%.
The resulting microemulsion was of the o/w type.

Example 14

0.36 g of a rough perfluoropolyether belonging to class 1, hydrolized by hot treatment with $H_2SO_4$, having an average equivalent weight of 7,000 with respect to the acid groups and an average viscosimetric molecular weight of 4,000, containing peroxide bridges (PO=1.01%) and consisting of a mixture of polymers having different molecular weight, were neutralized with 0.1 ml of an ammonia solution at 10% by weight of $NH_3$ and added with 0.5 ml of a 0.1M solution of $KNO_3$.

To this system there were added 1.5 ml of an aqueous solution of ammonium perfluorooctanoate at a concentration of 360 g/l and 0.2 ml of terbutanol.

A system characterized by a single limpid, transparent phase, indefinitely stable at a temperature higher than 40° C., was obtained.

The weight composition of the system was as follows:
aqueous phase: 60%
alcohol: 5%
fluorinated surfactant: 21%
rough perfluoropolyether: 14%.
The obtained microemulsion was of the o/w type.

Example 15

A solution was prepared as is described in example 14. To this solution there were added, under gentle stirring, 0.36 g of a rough perfluoropolyether belonging to class 1, hydrolized by hot treatment with $H_2SO_4$, having an average equivalent weight of 7,000 with respect to the acid groups and an average viscosimetric molecular weight equal to 4,000, containing peroxide bridges and consisting of a mixture of polymers having different molecular weights.

The resulting system was table at a temperature lower than 50° C., exhibited birefringence characteristics, and the rough perfluoropolyether therein contained was still solubilized.

The weight composition of the system was as follows:
aqueous phase: 53.5%
alcohol: 4.5%
fluorinated surfactant: 18.0%
rough perfluoropolyether: 24.0%.
The obtained microemulsion was of the o/w type.

Example 16

1.8 g of a rough perfluoropolyether belonging to class 1, having an average funtionality equal to 0.45 in acid groups and an average viscosimetric molecular weight equal to 3,650, consisting of a mixture of polymers having different molecular weights were neutralized with 1 ml of an ammonia solution at 6% by weight of $NH_3$ and added with 1 ml of bidistilled water.

0.8 ml of isopropanol were added to this system under gentle stirring.

The resulting microemulsion was macroscopically consisting of a limpid, transparent liquid, indefinitely stable in the temperature range of 25°–75° C.

The weight composition of the system was as follows:

aqueous phase: 45.1% alcohol: 14.3% rough perfluoropolyether: 40.6%.

Example 17

18 g of a surfactant consisting of an acid having a perfluoropolyethereal structure belonging to class 1, consisting of a mixture of components having different molecular weights, and exhibiting an average equivalent weight equal to 690 with respect to the acid groups, were salified with 10 ml of an ammonia solution at 10% by weight of $NH_3$. Thereto there were added 20 ml of bidistilled water, 6 ml of anhydrous ethanol and 3.6 g of a dialcohol having a perfluoropolyethereal structure belonging to class 2, having an average molecular weight equal to 2,000 and a functionality equal to 2 with end groups —$CH_2OH$.

The resulting monophase system appeared macroscopically as a limpid, transparent liquid, which was indefinitely stable in the temperature range of 40°–50° C.

The weight composition of the system was as follows:

aqueous phase: 53.2% alcohol: 8.5% perfluorinated phase: 38.0%

Although the invention has been described in conjunction with specific embodiments, it is evident that many alternatives and variations will be apparent to those skilled in the art in light of the foregoing description. Accordingly, the invention is intended to embrace all of the alternatives and variations that fall within the spirit and scope of the appended claims. The above references are hereby incorporated by reference.

What is claimed is:

1. A thermodynamically stable microemulsion of the oil-in-water (o/w) or water in oil (w/o) type, consisting of the following components:

water, a liquid perfluoropolyether substantially insoluble in water having an average molecular weight of from 1,500 to 10,000 and end groups at least partially of the functionalized hydrophylic type, an ionic or non-ionic perfluorinated surfactant in an amount from 0 to 21 weight percent, a co-surfactant, consisting of a hydrogenated alcohol having 1 to 12 carbon atoms, and optionally one or more water-soluble electrolytes, said functionalized end groups being represented by the formula —$(B)_nT_m$ wherein n=0 or 1, B is a linking hydrocarbon radical, either divalent or polyvalent, in particular an alkylene or a cycloalkylene or an arylene radical, having up to 20 carbon atoms, m varies from 1 to 3, and T is one of the following groups or radicals:

—COOH, —$SO_3H$, —OH, polyoxyalkylene—OH, an ester or amidic or aminic or quaternary ammonium group with the proviso that when n=0, T also includes H, whereby the microemulsions exhibit the property of requiring, for being formed, a lower surfactant amount with respect to corresponding microemulsions of perfluoropolyethers having perfluoroalkyl end groups;

wherein the perfluoropolyether consists of fluorooxyalkylene units selected from the group consisting of:

$$(CF\!\!-\!\!CF_2O), (CF_2CF_2O), (CF_2O), (CFO), (CF_2\!\!-\!\!CFO),$$
   $$\phantom{xx}|\phantom{xxxxxxxxxxxxxxxxxxxxxxxxx}|\phantom{xxxxxxx}|$$
   $$\phantom{x}CF_3\phantom{xxxxxxxxxxxxxxxxxxxxxxxx}CF_3\phantom{xxx}CF_3$$

$(CF_2CF_2CF_2O)$ and $(CF_2CF_2CH_2O)$, and in particular belonging to the following groups:

$$R_fO(CF\!\!-\!\!CF_2O)_n(CFO)_m(CF_2O)_pR'_f \quad (1)$$
   $$\phantom{xxx}|\phantom{xxxxxxxxx}|$$
   $$\phantom{xx}CF_3\phantom{xxxxx}CF_3$$

with a random distribution of the perfluorooxyalkylene units, where m, n, p have such average values as to meet the abovesaid requirements regarding the previously indicated molecular weight and Rf and R'f are the above defined functional groups and, optionally, in part perfluoroalkyl groups;

(2) $R_fO(CF_2CF_2O)_n(CF_2O)_mR'_f$ with a random distribution of the perfluorooxyalkylene units, wherein m, n have such values as to meet the abovesaid requirements and Rf and R'f are the above defined functional groups and, optionally, in part perfluoroalkyl groups;

$$R_fO(CF_2CF_2O)_n(CF_2O)_m\!\!\left(\!\!\begin{array}{c}CFO\\|\\CF_3\end{array}\!\!\right)_p\!\!\left(\!\!\begin{array}{c}CF\!\!-\!\!CF_2O\\|\\CF_3\end{array}\!\!\right)_o\!\!-R'_f \quad (3)$$

wherein m, n, p, o have such values as to meet the above-indicated requirements and Rf and R'f are the above defined functional groups and, optionally, in part perfluoroalkyl groups;

$$R_fO\!\!\left(\!\!\begin{array}{c}CF\!\!-\!\!CF_2O\\|\\CF_3\end{array}\!\!\right)_n\!\!-R'_f \quad (4)$$

wherein n has such a value as to meet the above-indicated requirements and Rf and R'f are the above defined functional groups and, optionally, in part perfluoroalkyl groups;

(5) $R_fO(CF_2CF_2O)_nR'_f$ wherein n has such an average value as to meet the abovesaid requirements and Rf and R'f are the above defined functional groups and, optionally, in part perfluoroalkyl groups;

(6) $R_fO(CF_2CF_2CF_2O)_nR'_f$ or $R_fO(CH_2CF_2CF_2O)_nR'_f$ wherein n has such a value as to meet the abovesaid requirements and Rf and R'f are the above defined functional groups and, optionally, in part perfluoroalkyl groups.

wherein said thermodynamically stable microemulsion is spontaneously formed by simple mixing of the components.

2. Microemulsions according to claim 1 wherein the perfluoropolyether of classes 1, 2 and 3 are rough products of the photo-oxidation process containing peroxide groups —OO— in the chain.

3. A thermodynamically stable microemulsion according to claim 1, wherein the functionality is between 0.3 and 1.

4. The thermodynamically stable microemulsion according to claim 1, wherein the functionality is between 0.1 and 4.

5. The thermodynamically stable microemulsion according to claim 1, wherein the molecular weight is between 2,000 and 6,000.

6. The microemulsion of claim 1, wherein the perfluorinated surfactant is selected from the group consisting of:

(a) $C_5$-$C_{11}$ perfluorocarboxylic acids and the salts thereof;

(b) $C_5$-$C_{11}$ perfluorosulphonic acids and the salts thereof;

(c) non-ionic surfactants consisting of a perfluoroalkyl chain and of a polyoxyalkylene hydrophilic head;

(d) mono- and bi-carboxylic acids derived from perfluoropolyethers having a mean molecular weight not higher than 1,000, and the salts thereof;

(e) non-ionic surfactants consisting of a perfluoropolyether chain bound to a polyoxyalkylene chain; and, (f) perfluorinated cationic surfactants or those derived from perfluoropolyethers having 1, 2 or 3 hydrophobic chains.

7. The microemulsion of claim 1, wherein T is a —COOH, an —OH, a polyoxyalkylene—OH, or a quaternary ammonium group.

8. A thermodynamically stable microemulsion of the oil-in-water (o/w) or water in oil (w/o) type form, in the absence of a fluorinated surfactant, consisting of the following components: water, an ionic or non-ionic liquid perfluoropolyether substantially insoluble in water in an amount from 0 to 21 weight percent and having an average molecular weight of from 1,500 to 10,000 and end groups at least partially of the functionalized hydrophylic type, and optionally one or more water-soluble electrolytes, said functionalized end groups being represented by the formula $$-(B)_n T_m$$

wherein n=0 or 1, B is a linking hydrocarbon radical, either divalent or polyvalent, in particular an alkylene or a cycloalkylene or an arylene radical, having up to 20 carbon atoms, m varies from 1 to 3, and T is one of the following groups or radicals: —COOH, —SO$_3$H, —OH, polyoxyalkylene—OH, an ester or amidic or aminic or quaternary ammonium group, with the proviso that when n=0, T also includes H;

wherein the perfluoropolyether consists of fluorooxyalkylene units selected from the group consisting of:

$$(\underset{\underset{CF_3}{|}}{CF}-CF_2O), (CF_2CF_2O), (CF_2O), (\underset{\underset{CF_3}{|}}{CFO}), (CF_2-\underset{\underset{CF_3}{|}}{CFO}),$$

$$(CF_2CF_2CF_2O) \text{ and } (CF_2CF_2CH_2O),$$

and in particular belonging to the following groups:

$$R_fO(\underset{\underset{CF_3}{|}}{CF}-CF_2O)_n(\underset{\underset{CF_3}{|}}{CFO})_m(CF_2O)_pR'_f \quad (1)$$

with a random distribution of the perfluorooxyalkylene units, where m, n, p have such average values as to meet the abovesaid requirements regarding the previously indicated molecular weight and Rf and R'f are the above defined functional groups and, optionally, in part perfluoroalkyl groups;

(2) $R_fO(CF_2CF_2O)_n(CF_2O)_m R'_f$ with a random distribution of the perfluorooxyalkylene units, wherein m, n have such values as to meet the abovesaid requirements and Rf and R'f are the above defined functional groups and, optionally, in part perfluoroalkyl groups;

$$R_fO(CF_2CF_2O)_n(CF_2O)_m \left(\underset{\underset{CF_3}{|}}{CFO}\right)_p \left(\underset{\underset{CF_3}{|}}{CF}-CF_2O\right)_o -R'_f \quad (3)$$

wherein m, n, p, o have such values as to meet the above-indicated requirements and Rf and R'f are the above defined functional groups and, optionally, in part perfluoroalkyl groups;

$$R_fO\left(\underset{\underset{CF_3}{|}}{CF}-CF_2O\right)_n -R'_f \quad (4)$$

wherein n has such a value as to meet the above-indicated requirements and Rf and R'f are the above defined functional groups and, optionally, in part perfluoroalkyl groups;

(5) $R_fO(CF_2CF_2O)_n R'_f$ wherein n has such an average value as to meet the abovesaid requirements and Rf and R'f are the above defined functional groups and, optionally, in part perfluoroalkyl groups;

(6) $R_fO(CF_2CF_2CF_2O)_n R'_f$ or $R_fO(CH_2CF_2CF_2O)_n R'_f$ wherein n has such a value as to meet the abovesaid requirements and Rf and R'f are the above defined functional groups and, optionally, in part perfluoroalkyl groups;

wherein said thermodynamically stable microemulsion is spontaneously formed by simple mixing of the components.

9. A thermodynamically stable microemulsion of the oil-in-water (o/w) or water in oil (w/o) type, comprising the following components: water, a rough perfluoropolyether substantially insoluble in water having an average molecular weight of from 1,500 to 10,000 and end groups at least partially of the functionalized hydrophylic type, perfluorinated surfactant in an amount of from 0 to 21 weight present, a co-surfactant which is hydrogenated, wherein said at least partially functionalized end groups are represented by the formula $$-(B)_n T_m$$

wherein n=0 or 1, B is a linking hydrocarbon radical, either divalent or polyvalent, in particular an alkylene or cycloalkylene or an arylene radical, having up to 20 carbon atoms, m varies from 1 to 3, and T is one of the following groups or radicals: —COOH, —SO$_3$H, —OH, polyoxyalkylen—OH, an ester or amidic or aminic or quaternary ammonium group, with the proviso that when n=0, T also includes H;

wherein the perfluoropolyether consists of fluorooxyalkylene units selected from the group consisting of:

$$(\underset{\underset{CF_3}{|}}{CF}-CF_2O), (CF_2CF_2O), (CF_2O), (\underset{\underset{CF_3}{|}}{CFO}), (CF_2-\underset{\underset{CF_3}{|}}{CFO}),$$

$$(CF_2CF_2CF_2O) \text{ and } (CF_2CF_2CH_2O),$$

and in particular belonging to the following groups:

$$R_fO(\underset{\underset{CF_3}{|}}{CF}-CF_2O)_n(\underset{\underset{CF_3}{|}}{CFO})_m(CF_2O)_pR'_f \quad (1)$$

with a random distribution of the perfluorooxyalkylene units, where m, n, p have such average values as to meet the abovesaid requirements regarding the previously indicated molecular weight and Rf and R'f are the above defined functional groups and, optionally, in part perfluoroalkyl groups;

(2) $R_fO(CF_2CF_2O)_n(CF_2O)_mR'_f$ with a random distribution of the perfluorooxyalkylene units, wherein m, n have such values as to meet the abovesaid requirements and Rf and R'f are the above defined functional groups and, optionally, in part perfluoroalkyl groups;

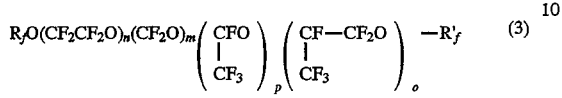 (3)

wherein m, n, p, o have such values as to meet the above-indicated requirements and Rf and R'f are the above defined functional groups and, optionally, in part perfluoroalkyl groups;

 (4)

wherein n has such a value as to meet the above-indicated requirements and Rf and R'f are the above defined functional groups and, optionally, in part perfluoroalkyl groups;

(5) $R_fO(CF_2CF_2O)_nR'_f$ wherein n has such an average value as to meet the abovesaid requirements and Rf and R'f are the above defined functional groups and, optionally, in part perfluoroalkyl groups;

(6) $R_fO(CF_2CF_2CF_2O)_nR'_f$ or $R_fO(CH_2CF_2CF_2O)_nR'_f$ wherein n has such a value as to meet the abovesaid requirements and Rf and R'f are the above defined functional groups and, optionally, in part perfluoroalkyl groups;

wherein said thermodynamically stable microemulsion is spontaneously formed by simple mixing of the components.

10. The microemulsion of claim 9 further comprising absence of said perfluorinated surfactant.

11. The microemulsion of claim 10 wherein the co-surfactant is an alcohol.

12. The microemulsion of claim 11 wherein the alcohol is t-butanol.

13. The microemulsion of claim 12 wherein the water is present in an amount ranging from about 1.5 to about 16% by weight, wherein the perfluoropolyether is present in an amount ranging from about 72 to about 84% by weight, and wherein the t-butanol is present in an amount ranging from about 13 to about 15% by weight.

14. A microemulsion consisting essentially of the following components: water, an alcohol and a rough perfluoropolyether substantially insoluble in water having a molecular weight of from 2,000 to 6,000 and having end groups comprising —H, —COOH, —SO$_3$H, —OH, polyoxyalkylene—OH, an ester or amidic or aminic or quaternary ammonium group;

wherein the perfluoropolyether consists of fluorooxyalkylene units selected from the group consisting of:

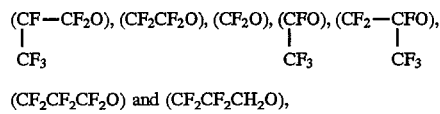

$(CF_2CF_2CF_2O)$ and $(CF_2CF_2CH_2O)$, and in particular belonging to the following groups:

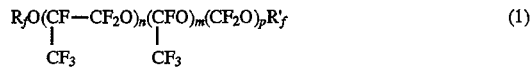 (1)

with a random distribution of the perfluorooxyalkylene units, where m, n, p have such average values as to meet the abovesaid requirements regarding the previously indicated molecular weight and Rf and R'f are the above defined functional groups and, optionally, in part perfluoroalkyl groups;

(2) $R_fO(CF_2CF_2O)_n(CF_2O)_mR'_f$ with a random distribution of the perfluorooxyalkylene units, wherein m, n have such values as to meet the abovesaid requirements and Rf and R'f are the above defined functional groups and, optionally, in part perfluoroalkyl groups;

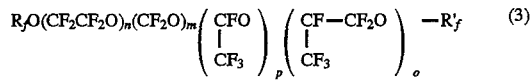 (3)

wherein m, n, p, o have such values as to meet the above-indicated requirements and Rf and R'f are the above defined functional groups and, optionally, in part perfluoroalkyl groups;

 (4)

wherein n has such a value as to meet the above-indicated requirements and Rf and R'f are the above defined functional groups and, optionally, in part perfluoroalkyl groups;

(5) $R_fO(CF_2CF_2O)_nR'_f$ wherein n has such an average value as to meet the abovesaid requirements and Rf and R'f are the above defined functional groups and, optionally, in part perfluoroalkyl groups;

(6) $R_fO(CF_2CF_2CF_2O)_nR'_f$ or $R_fO(CH_2CF_2CF_2O)_nR'_f$ wherein n has such a value as to meet the abovesaid requirements and Rf and R'f are the above defined functional groups and, optionally, in part perfluoroalkyl groups;

wherein said thermodynamically stable microemulsion is spontaneously formed by simple mixing of the components.

15. The microemulsion of claim 14 wherein the water is about 1.5 to about 16% by weight of the microemulsion, wherein the perfluoropolyether is about 72 to 84% by weight of the microemulsion, and wherein the alcohol is t-butanol and is about 13 to 15% by weight of the microemulsion.

* * * * *